US012523446B2

(12) United States Patent
Spade

(10) Patent No.: US 12,523,446 B2
(45) Date of Patent: Jan. 13, 2026

(54) AUTOMATIC ACTIVATION OF ELECTRONIC OPTIC

(71) Applicant: Steven David Spade, Rochester, PA (US)

(72) Inventor: Steven David Spade, Rochester, PA (US)

(73) Assignee: Steven David Spade, Rochester, PA (US)

( * ) Notice: Subject to any disclaimer, the term of this patent is extended or adjusted under 35 U.S.C. 154(b) by 0 days.

(21) Appl. No.: 18/749,533

(22) Filed: Jun. 20, 2024

(65) Prior Publication Data
US 2025/0389519 A1 Dec. 25, 2025

(51) Int. Cl.
F41G 3/06 (2006.01)
(52) U.S. Cl.
CPC ..................... F41G 3/06 (2013.01)
(58) Field of Classification Search
CPC ........................................ F41G 3/06

USPC ............................................ 42/111
See application file for complete search history.

(56) References Cited

U.S. PATENT DOCUMENTS

| 11,927,428 B1* | 3/2024 | Kraft | H04N 5/63 |
| 2018/0195836 A1* | 7/2018 | Matthews | F41C 27/00 |
| 2018/0299217 A1* | 10/2018 | Hedeen | F41A 19/01 |

* cited by examiner

Primary Examiner — Samir Abdosh
(74) Attorney, Agent, or Firm — FERENCE & ASSOCIATES LLC

(57) ABSTRACT

One embodiment provides a device including an electronic optic comprising an initiation component. The initiation component is triggered via an activation object located external to the electronic optic. The initiation component, when triggered, causes activation of the electronic optic. A movement of the electronic optic from a first position to a second position includes a movement with respect to the activation object and causes the triggering of the initiation component. Other aspects are described and claimed.

18 Claims, 2 Drawing Sheets

AUTOMATIC ACTIVATION OF ELECTRONIC OPTIC

BACKGROUND

Many weapons have optics or sights that assist a user in aiming the weapon. Some optics are manual sights where the markers of the sights are stationary and located on the weapon. Such sights generally have multiple markers where the user lines up the markers when taking aim. Electronic optics utilize electronics to display or project an aiming aid. For example, some electronic optics project a dot that is visible to the user. The user then lines the dot up with the desired location and utilizes the dot when aiming the weapon. Some electronic sights include reflex sights, holographic sights, laser sights, and/or the like. Other electronic optics provide for optical magnification which assists in seeing targets at a larger size. Each of the different electronic optics works a little differently than others and may be utilized for different purposes, but all have a power source that powers the electronics contained within the optics.

BRIEF SUMMARY

In summary, one aspect provides a device, the device including: an electronic optic including an initiation component, wherein the initiation component is triggered via an activation object located external to the electronic optic; wherein the initiation component, when triggered, causes activation of the electronic optic; and wherein a movement of the electronic optic from a first position to a second position includes a movement with respect to the activation object and causes the triggering of the initiation component.

Another aspect provides a system, the system including: an electronic optic including an initiation component that causes activation of the electronic optic; and an activation object located external to the electronic optic; wherein the initiation component is triggered by the activation object; and wherein a movement of the electronic optic from a first position to a second position includes a movement with respect to the activation object and causes the triggering of the initiation component.

A further aspect provides a method for automatically activating an electronic optic, the method including: detecting, using an initiation component of the electronic optic, movement of the electronic optic from a first position to a second position, wherein the movement includes movement with respect to an activation object; and automatically activating, based upon the detected movement, the electronic optic, wherein the automatically activating includes receiving a signal from an initiation component of the electronic optic that is triggered via the activation object.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
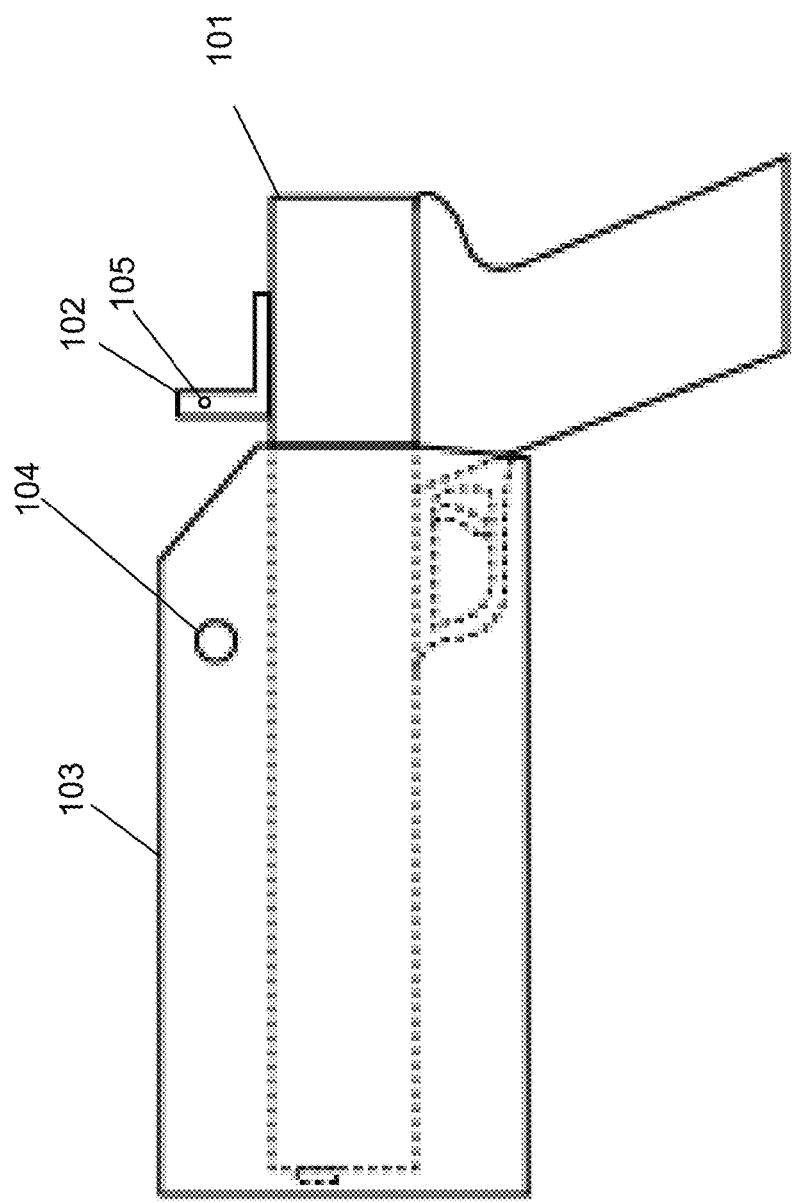
FIG. 1 illustrates an example device for the automatic activation of an electronic optic utilizing an activation object.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While electronic optics are useful for assisting users in aiming a weapon, the downside is that they require a power source to work. Since many types of electronic optics are utilized on weapons, the electronic optics need to be small and lightweight so as to not significantly increase the size or weight of the weapon. If the size or weight were to be significantly increased, many users would not utilize the electronic optics as the benefit of having the electronic sight would not outweigh the detriment of the addition of the weight and the increase in size of the weapon with the optics installed. Additionally, since optics are utilized with weapons that are carried with a person, the power source has to allow portability of the optics. Thus, most optics are powered by a battery. A battery is relatively small and lightweight and also allows portability of the optics.

However, the problem with a battery is that the battery charge eventually diminishes, thereby either requiring recharging, if the battery is rechargeable, or the replacement of the battery. If the battery needs charged or changed while the optic is being utilized, it can render the optic inoperable, thereby preventing the user from utilizing the optic which can have significant consequences. For those optics having changeable batteries, the user can change the battery in the field, but this takes time and, depending on the situation, the user may not have time to safely change the battery. Thus, there is a desire to extend the amount of time that the optic can be utilized on a single battery, thereby reducing the number of lifetime battery changes for the optic. Accordingly, some optics include an automatic shut-off where the optic will shut-off after a period of time, thereby preserving the battery life. However, this length of time is generally significant, for example, measured in hours. If the optic is inadvertently left on for this amount of time, the battery life is significantly reduced.

Another issue with electronic optics is the steps required to turn it on. Generally, to turn on the optics, the user has to push a button, a set of buttons, or a series of buttons. Different button configurations may result in the optic performing different functions. For example, if a particular set or series of buttons are activated, the automatic shut off may be activated. One of the reasons for the long delay in the automatic shut off is because of the inconvenience of turning the optic on. If the user has to turn the optic on every time after a few minutes, the user would not use the automatic shutoff because it would cause too many issues. Additionally, the user may turn on the optic knowing that it will be utilized at some near point in the future and may expect it to be on when it is needed. Turning on the optic utilizing buttons, particularly in a situation where seconds and milliseconds count, may be cumbersome. Thus, many users may leave the optics on for the desired period of time. However, this causes the depletion of the battery charge.

One technique to overcome the issues with turning the optic on in a high-speed situation, or simply if desired by the user, is a technique called "shake awake." With the shake awake, the user "shakes" the optic, thereby causing the optic to turn on. While this may be easier than trying to push little buttons to get the optics to turn on, it still takes time to shake the optic awake. Additionally, this is an extra movement that may be undesirable to the users. Finally, this does not solve the problem of turning off the optic as there is no corresponding turn off motion or movement.

Accordingly, the described system and method provides a technique for automatically activating, and deactivating, an electronic optic based upon a movement of the optic with respect to an activation object. The electronic optic includes an initiation component that is triggered via the activation object. The activation object may be located external to the electronic optic. When the electronic optic is moved from a first position to a second position and with respect to the activation object, the activation object causes the triggering of the initiation component, thereby activating the electronic optic. The activation object may be a physical protrusion that pushes the initiation component, for example, the activation button, on the electronic optic, thereby causing the electronic optic to be activated.

The activation object may also be an object that electrically communicates with the initiation component to trigger the initiation component. For example, the activation object may be a transmitter and the initiation component of the optic may be receiver. Upon the movement of the electronic optic, the transmitter may send a signal to the receiver to activate the optic. Alternatively, the activation object and the initiation component may be in communication and, upon the initiation component of the optic being moved a predetermined distance from the activation object, the communication may be broken, thereby triggering the initiation component to activate the optic.

Similar to the activation of the optic, a second movement of the optic may cause the deactivation of the optic. For example, by moving the optic to a third position, which may be the same as the first position, the initiation component, or a second initiation component, of the optic is triggered. This initiation component then causes the optic to be deactivated, thereby conserving battery of the optic. The initiation component that is triggered to activate the optic may be the same or a different initiation component than the initiation component that is triggered to deactivate the optic.

Therefore, a device and system provide a technical improvement over traditional electronic optics. Instead of relying on the user to activate, and deactivate, the optic, the described device and method automatically activates and deactivates the optic. Thus, the user does not have to perform additional steps to get the optic activated, thereby saving steps and time. Additionally, since the optic is automatically activated and deactivated, the battery, or other power source, of the optic is conserved, thereby ensuring the optic is ready for use when it is needed. Since the optic can be automatically deactivated upon detection of a movement, the optic does not have to remain on for the entirety of the automatic shutoff period which significantly decreases the drain on the power source of the optic. Accordingly, the described device and method provides a device that saves power and time through the automatic activation and deactivation of the electronic optic, resulting in a more user-friendly, reliable, and cost-effective device as compared to traditional electronic optics.

The illustrated example embodiments will be best understood by reference to the figures. The following description is intended only by way of example, and simply illustrates certain example embodiments.

FIG. 1 illustrates an example device for the automatic activation of an electronic optic 102 utilizing an activation object 104. The electronic optic may be any type of optic that is powered. Thus, the term electronic optic includes electronic sights (e.g., reflex sights, holographic sights, laser sights, reflector sights, etc.), magnification optics, distance identification optics, a laser or infrared aiming device located on or utilized with a gun, and/or the like. Electronic optics include a power source, usually a battery which could be a rechargeable battery but may be a standard battery. Other power sources are possible, including circuitry to run off a wired power source, solar power, and/or the like. The electronic optic also includes additional circuitry, for example, the circuitry and components needed to display or project an aiming aid. The electronic optic may also include movement sensors, for example, accelerometers, gyroscopes, and/or the like, that can detect movement of the optic. In the traditional optic, the movement sensors may be utilized in the shake awake application to detect movement of the optic when the user is attempting to shake the optic awake. However, as discussed in additional detail herein, the movement sensors may additionally be utilized to assist in determining if the electronic optic should be activated or deactivated.

The optic 102 may be installed on a gun 101. The example used here throughout will be the example of a firearm, specifically, a pistol. However, the described device is not limited to use with a pistol, but can be used with any gun. The term "gun" will be used here throughout. Traditionally, a gun is defined as a device that propels projectiles using a force, for example, pressure or explosive force. However, "gun" as used here throughout is intended to encompass any type of device that propels projectiles or simulates the firing of a traditional gun. In other words, the term "gun" includes, in addition to the traditional meaning of the word, the devices that are used to simulate a gun without actually propelling a projectile and any device that propels a projectile using a force. Some examples of guns include, but are not limited to, a pistol, rifle, water gun, paintball gun, rail gun, taser, BB gun, salt gun, air gun, pellet gun, simunition gun, laser gun, cap gun, infrared gun, nail gun, slingshot, bow and arrow, crossbow, compound bow, and/or the like. Thus, any gun to which an optic could, either today or in the future, be installed, is intended to be encompassed within this disclosure. Additionally, not all electronic optics may be installed on a gun and, instead, could be utilized as a standalone device. The described device could also be used on such electronic optics. In other words, the described device can be used on or within any electronic optics regardless of whether the optics is used individually or in conjunction with another object, for example, a gun.

The electronic optic 102 includes an initiation component 105. This initiation component 105 is triggered via an activation object 104. When the initiation component 105 is triggered, it causes activation of the electronic optic 102. In other words, the initiation component 105 causes the electronic optic 102 to be turned on or otherwise activated. The activation object 104 is located external to the electronic optic 102, whereas the initiation component 105 is generally located within the electronic optic 102. However, the initiation component 105 could be located on an external surface of the electronic optic 102. For example, the initiation component 105 may be the traditional button(s) that are included on electronic optics to activate the electronic optic 102, for example, by a user pressing the button(s). The activation object 104 may be located on an external surface of the electronic optic 102, but may generally be located on an object other than the electronic optic 102, for example, a holster 103. Other objects that the activation object 104 may be located on include, but are not limited to, a shirt or chest of a user, a cover of the optic, a sling of the gun, a belt, an activation object holder, pants of a user, and/or the like. The location of the activation object 104 may be dependent on the type of the activation object 104.

Movement of the electronic optic 102 from a first position to a second position and with respect to the activation object 104 causes the triggering of the initiation component 105. In other words, it is the movement of the electronic optic 102 as related to the activation object 104 that causes the triggering of the initiation component 105 that then causes the activation of the electronic optic 102. Movement from a first position to a second position is movement from a first position to another position. In other words, the first position and second position are not specific positions, but rather delineate that the optic has been moved from one position to another position without a designation of the particular positions. Thus, a first position and second position may be different positions each time the optic is moved. Rather, the first position and second position more accurately identify a location of the initiation component 105 with respect to the activation object 104, where the first position is a position that does not cause a triggering of the initiation component and activation of the optic and the second position is a position that does cause a triggering of the initiation component and activation of the optic. Accordingly, the first position and second position may be different positions and may also be based upon the type of activation object and initiation component utilized.

The activation object 104 and initiation component 105 may be a set of objects that work in conjunction to activate the electronic optic 102. Since electronic optics 102 generally include an initiation component or object that is utilized to activate the optic, one type of activation object may be an object that can activate the optic utilizing the initiation component that is already included in the optic. For example, many optics include a button that is pressed to activate the optic. For the purposes of this disclosure, this optic activation button will be treated as an initiation component that triggers the activation of the optic. Accordingly, one activation object may be a physical object that is able to press the optic activation button/initiation component. The physical object may be a physical protrusion that presses the initiation component. Thus, the initiation component (button) is triggered by the activation object (physical protrusion) when the movement of the optic causes the activation object to touch the initiation component.

In the case where the activation object 104 is a physical protrusion that presses the initiation component 105, the movement of the optic with respect to the activation object is a movement that causes the activation object 104, the physical protrusion in this case, to touch the initiation component 105, thereby triggering the initiation component. As an example, a user may have a holster 103, as illustrated in FIG. 1, where the pistol 101 is held until the user is ready to utilize the pistol 101 and optic 102. In the example illustrated in FIG. 1, the holster 103 does not cover the optic 102, but some holsters do cover the optic. In such a holster, the holster may include a physical protrusion that is located at a location within the holster such that when the user draws the pistol from the holster, the protrusion presses the activation button(s) (initiation component(s)) on the optic, thereby triggering the initiation component to cause the optic to be activated. Thus, in the case of the physical protrusion, the first position may be a position where the button (initiation component) does not touch the physical protrusion (activation object) and the second position is a position where the button (initiation component) does or did touch the physical protrusion (activation object) when the optic was moved.

It should be noted, as previously mentioned, that pistols are not the only guns that may use a holster or other object that may cover the optic and, thereby provide an object to which a physical protrusion could be included. For example, a user may have an optic cover that covers the optic until the user is ready to utilize it. The optic cover may have such a protrusion that presses the optic initiation component (button) when the user removes the cover from the optic. As another example, an electronic optic may be stored in a bag or other carrying or covering device that could have a protrusion that can press the optic initiation component (button) when the optic is removed from the bag or carrying or covering device.

The physical protrusion may be of a size and shape so as to press the initiation component when the optic is moved from the first position to a second position. Additionally, the physical protrusion needs to be stiff enough to press the optic initiation component (button) when the optic is moved from the first position (e.g., within the holster, within the bag, covered with an optic cover, etc.) to a second position (e.g., outside the holster, outside the bag, the optic cover removed, etc.), but also needs to not cause damage to the optic or re-press the initiation component when the optic is put back into the first position. Accordingly, the physical protrusion may be made so as to meet these needs.

As a first example, the physical protrusion may be designed to retract when pressed in a first direction, but not when pressed in a second direction. Thus, when the optic is moved from the first position to a second position, the physical protrusion may not retract, thereby touching or pressing the initiation component. However, when the optic is moved back to the first position, the physical protrusion may retract within the object, for example, due to the force being pressed against it. A retracting physical protrusion may also be activated via a switch, trigger, or other device. When the switch, trigger, or other device is triggered, the physical protrusion may be retracted and held in the retracted position and when the switch or other device is not triggered, the physical protrusion may be un-retracted, or vice versa. As another example, the physical protrusion may be made of a stiff but soft material which presses against the initiation component, but that does not cause damage to the optic or other parts of the gun.

Other physical protrusions are contemplated and possible and these examples are only illustrative and are not intended to be limiting. Additionally, if the optic includes a button or initiation component for deactivation of the optic, the device may include multiple physical protrusions, either of a similar type or different, that are located so as to press the activation initiation component when the optic should be activated and press the deactivation initiation component when the optic should be deactivated.

The initiation component may be triggered when the movement from the first position to the second position causes the activation object to be a predetermined threshold distance from the initiation component. In other words, when the optic housing the initiation component moves at least a predetermined threshold distance from the activation object, the initiation component is triggered, thereby activating the optic. Alternatively, the initiation component may be triggered when the movement from the first position to the second position causes the initiation component to be within a predetermined distance of the activation object. In other words, when the optic housing the initiation component moves within a predetermined distance of the activation object, the initiation component is triggered, thereby activating the optic. For example, with the physical protrusion example, the initiation component is moved within a predetermined distance of the activation object, thereby triggering the initiation component. However, other activation objects and initiation components can also work based upon the initiation component being moved within a predetermined distance of the activation object, as discussed in more detail herein.

Another activation object may be an object that electrically communicates with the initiation component. In this case, the optic 102 may include an initiation component 105 that is able to communicate with the activation object 104. Movement from the first position to the second position of the electronic optic 102 causes a change in the communication between the activation object 104 and the initiation component 105, thereby causing the initiation component to be triggered and cause the optic to be activated. Depending on the type of initiation component and activation object pair, the movement could cause the activation object to send a signal to the initiation component, thereby triggering the initiation component and causing the optic to be activated. Alternatively, or additionally, the movement could cause a break in the communication between the activation object and the initiation component, thereby triggering the initiation component and causing the optic to be activated. The activation object and initiation component may both require power, may both require no additional power, or be a combination of both.

The communication between the activation object and the initiation component may be any type of communication, including, but not limited to, near field communication, short range communication, and/or the like. Other types of non-traditional communication are also contemplated and possible. For example, detection of different types of electrical fields, magnetic fields, or other types of fields. In other words, the communication between the activation object may be an active communication or detection of a trigger that is treated as a communication or signal to the initiation component to be triggered and activate the electronic optic.

Since the communication channels may have a longer range than is desirable in a particular application, it should be noted that the range of the communication generated by either the initiation component, the activation object, or both, may be reduced through programming. In other words, the communication channels can be attenuated in order to be usable in the desired application.

An activation object and initiation component set where one requires power and the other is passive is a receiver and passive transmitter combination. While a receiver and passive transmitter are identified, this is merely illustrative as other initiation component and passive activation objects combinations are possible and contemplated. For example, the activation object may be a passive antenna, radio frequency identification (RFID) tag, quick read (QR) tag, bar code tag, proximity sensor, and/or the like. The initiation component may be a receiver, RFID tag, antenna, tag reader, code reader, proximity sensor, and/or the like. The activation object may include a passive sensor which is only activated when a signal is received from the corresponding initiation component. Additionally, passive sensors can derive power needed to power the sensor from a received signal. As an example, the activation object may include a passive transmitter that will not require an external power source. When the activation object receives a signal from the initiation component, the activation object will derive enough power from the signal to provide a response to the initiation component.

The transmitter could also be a powered or power-assisted transmitter or sensor. In this case, both the initiation component and activation object may be powered. The initiation component can then receive the provided response and take corresponding action. In the case that the initiation component is looking for a break in the communication with the activation object, the response will cause the initiation component to not be triggered, thereby not activating the optic. On the other hand, if the initiation component is looking for an active communication with the activation object, the response will cause the initiation component to be triggered, thereby activating the optic.

As an example of the above technology, an RFID tag (activation object), which could be a sticker, could be placed on an object (e.g., user, holster, rifle sling, belt, etc.) that is normally in close proximity to (within a predetermined distance to) the optic. While the optic is in close proximity to the activation object, the communication between the initiation component and activation object is successful. In other words, the initiation component and activation object can electrically communicate with each other, whether that is a constant communication or periodic communication. When the optic is moved from the first position (i.e., the position where the initiation component and activation object can communicate) to a second position (i.e., a position where the communication between the initiation component and activation object is broken or no longer possible), a change in the communication between the initiation component and activation object is detected. This change in communication causes the initiation component to be triggered, thereby causing the optic to be activated.

As an alternative example, the initiation component and activation object may not be in active communication with each other. In other words, the initiation component and activation object are not in constant or periodic communication with each other. However, upon the movement of the optic from the first position to the second position, the initiation component and activation object may come within range of each other, thereby causing the activation object to send an electric signal to the initiation component. This electric signal causes the initiation component to be triggered, thereby causing the optic to be activated. In other words, in this example, the initiation component and activation object may be located so that no communication is possible when the optic is in the first position. However, movement of the optic to the second position causes the initiation component and activation object to come into close enough proximity that they can communicate, thereby triggering the initiation component and causing the optic to be activated. Alternatively, the initiation component and activation object may be in close enough proximity to communicate with each other when the optic is in the first position, but the initiation component and activation object do not communicate until a trigger event is detected that causes the initiation component and activation object to communicate. Such a trigger event is discussed in more detail further herein.

As an example, where both the initiation component and activation object are active technology, the activation object may be an active emitter and have corresponding circuitry, including a power source, to power the emitter. For example, a user may wear a lanyard, badge, something worn on the belt, and/or the like, that includes the active emitter. When the optic housing the initiation component is in proximity to the activation object, the initiation component and activation object may be in communication with each other. When the initiation component moves a predetermined distance away from the activation object, the communication may be broken, thereby triggering the initiation component and causing the optic to be activated. Alternatively, the activation object may be located on an object or at a location on a user where the optic is normally used and needs to be activated. Thus, when the initiation component is within a predetermined distance of the activation object so that a communication between the initiation component and activation object is active, the initiation component may be triggered by the active communication, thereby causing the optic to be activated. Additionally, a trigger event may also be utilized to trigger the communication.

As should be understood, other types of active activation objects are contemplated and possible, for example, active antennas, active transmitters, and/or the like. In order to conserve battery power of the powered activation object, the powered activation object may turn off when the initiation component and activation object are not within a predetermined distance of each other. In other words, when the optic has been moved to a position where the initiation component and activation object cannot communicate, the activation object may be turned off to conserve battery power.

One type of set of initiation components and activation objects that are each passive includes the use of electric fields, magnetic fields, and/or the like, that can be utilized to change the state of the initiation component, thereby triggering the initiation component to activate the optic. Even though such sets of initiation components and activation objects could be both passive, either one or both of the initiation component and activation object in such a system could be active. Similarly, while other examples previously described have been described as being either active or passive, those examples could also be different with respect to whether they are active or passive.

Using a first example of a magnetic field, the activation object may be a magnet or set of magnets and the initiation component may be a component that can detect a magnetic field or a component that changes states based upon detection of a magnetic field. It should be noted that while the activation object is described as being a magnet or set of magnets, the initiation component may also, or alternatively, be a magnet or set of magnets and the activation object may be a component that detects magnetic fields or changes states responsive to the detection of a magnetic field. The magnets or set of magnets creates a magnetic field. The magnetic field can be utilized to change the state of a component or could be detected by the initiation component. In the case that a state of the component is changed, when the optic is moved from the first position to the second position it could pass by the activation device and, therefore, pass through the magnetic field. Passing through the magnetic field can cause the state of the component to be changed from one state to another state. In response to this change of state, the component is triggered, thereby activating the optic. In other words, in this example, the component is the initiation component which is triggered to cause activation of the optic.

As an example, the initiation component could be a magnetic switch which has an open state and a closed state. For purposes of this example, the state of the switch before triggering will be open. However, this is not strictly necessary and is only illustrative. Upon proximity to the magnetic field, the switch changes state from an open state to a closed state. This closed state may complete a circuit which causes the activation of the optic. Similarly, when the optic is brought into proximity to the magnets again, the state will change again, in this case opening, thereby breaking the circuit. This would cause the optic to be deactivated. Deactivation will be discussed in more detail herein. As another example, the activation object could be a magnet or set of magnets. When the optic, and therefore, the initiation component, is in proximity to (a predetermined threshold distance to) the activation object, the initiation component is one state. When the initiation component is moved a predetermined distance from the activation object, the state of the initiation component is changed, thereby activating the optic.

While a switch is used as an example, this is not the only type of component that can change state or be triggered upon proximity to or detection of a magnetic field or a change in a magnetic field. For example, other components are responsive to magnetic fields and could be utilized, for example, components that detect changes in magnetic fields, electromagnetic components, magnetic sensors (e.g., Hall Effect sensor, coiled-type magnetic sensor, magnetoresistive-type magnetic sensor, etc.), and/or the like.

Using the example of an electric field, the system could work in a similar manner to that discussed in connection with the magnetic field, except instead of detecting a magnetic field or change in a magnetic field, the initiation component would detect an electric field or change in an electric field. Other types of fields (e.g., electric field, magnetic field, radioactive field, etc.) could be utilized in a similar manner.

Electric fields can be different types of electric fields that can be detected in different ways. For example, while electric fields can include those fields which are put off by electric components or circuits like those mentioned above, electric fields may also include fields which are generated for a defined purpose, for example, light-based electric fields (e.g., lasers, infrared, ultraviolet, television, etc.), sound-based electric fields including both audible and inaudible sounds, and/or the like. In this type of application, the electric field may be the activation object. When the initiation component moves across the electric field, the electric field provides a signal detectable by the initiation component, thereby triggering the initiation component and causing the optic to be activated. As an example, an electronic optic may be kept in a safe, glove box, or other holding device. An electric field, for example, laser lights, may be set up to cross over the entrance or opening of the holding device. When the optic is moved across the opening, the laser triggers the initiation component, thereby causing the activation of the optic. Thus, this is an example of the initiation component being moved in proximity to (or within a predetermined distance to) the activation object and being triggered.

It should be noted that the above examples are not exhaustive and other sets of initiation components and activation objects can be utilized to cause the optic to be activated. Additionally, in some examples the activation object has been described as being a particular part of the set with the initiation component being described as the corresponding part of the set. However, it should be understood that the system could work with the parts being reversed, meaning the activation object could be the part described with respect to the initiation component and the initiation component could be the part described with respect to the activation object. Additionally, some examples describe the activation object and/or initiation component as being either active or passive, but the activation object and/or initiation component could be the opposite of that described, meaning an initiation component described as active could be replaced with a passive initiation component and an initiation component described as passive could be replaced with an active initiation component. This is also true for the activation object. It should also be noted that multiple initiation components and/or activation objects could be utilized, with the multiple initiation components and/or activation objects being the same or different and using the same or different activation techniques.

Though not strictly necessary, movement sensors, either those already installed in the electronic optic or those installed as part of the described optic, can be utilized to assist in identifying or detecting a movement of the optic. Thus, the information captured by the movement sensors could be utilized to agree with or confirm a detected movement and other information associated with the movement, for example, a position of the movement, a distance of the movement, an end position of the movement as compared to a start position of the movement, and/or the like. In the case that movement sensors are utilized to confirm a movement or other information associated with the movement, the optic may include circuitry or programming that allows the optic to effectively utilize such information. For example, if the movement sensor(s) is used to confirm the movement or a distance of the movement, the optic may include a circuit with both the initiation component and the movement sensor providing input to the circuit. The circuit may require a certain input from both the initiation component and movement sensor to provide a particular output that would cause the optic to be activated. For example, the initiation component and movement sensor may have to both provide input indicating the movement was of a particular distance or a movement associated with a movement that should activate the initiation component before the initiation component causes the optic to be activated.

The movement sensor may additionally, or alternatively, be utilized to cause the initiation component and/or activation object to look for a change in the communication between the initiation component and activation object. In other words, in order to save power, the initiation component or a circuit of the initiation component may not always be detecting a communication or change in communication between the initiation component and the activation object. Rather, the system may instead only look for the communication or a change in communication between the initiation component and activation object when a trigger event has been detected. One trigger event may be the detection of movement of the electronic optic. The movement sensors may be utilized to detect this movement which would cause the system to detect the communication or change in communication between the initiation component and activation object. The movement detected by the movement sensors could be any type of movement or may be a movement with particular features.

In the case that the system is looking for a movement with particular features, the system may analyze movement information captured by the movement sensors to determine if the particular features have been met. Movement features may include, but are not limited to, a distance of the movement, a force of the movement, a repetitiveness of the movement, a speed of the movement, a pattern of the movement, and/or the like. These movement features can be compared to stored movement features that have been identified as trigger movement features. If the detected movement features match one or more of the trigger movement features, the system may treat this as a trigger event and the system may then determine if the communication or a change in communication between the activation object and initiation component has been detected. Alternatively, if the detected movement features match one or more of the trigger movement features, this may cause the automatic activation of the optic. In other words, the detected movement features may be the activation object causing a triggering of the initiation component.

In order to prevent the activation of monitoring of the communication or change in communication with every possible movement, the system may require certain types or numbers of trigger movement features, which may vary with the type of trigger movement feature that is detected. A number or the type of trigger movement features that may be used to indicate a trigger event can be programmed within the system. Since some movement features may be more indicative of a movement that should be treated as a trigger event, some of the trigger movement features may be weighted. Higher weighted trigger movement features may require fewer or no more additional trigger movement features to confirm the trigger movement as compared to lower weighted trigger movement features. Different types of the trigger movement features may also be more indicative of a trigger movement than others, so these types of trigger movement features may require less confirmatory trigger movement features than other trigger movement features. The trigger movement features, analysis of the movement information, comparison of the movement information to the trigger movement features, and/or the like, may be performed on-board the optic, may be performed by a remote system in communication with the optic, or a combination of both.

In addition to the automatic activation of the optic utilizing an initiation component and activation object, the electronic optic could also be automatically deactivated. An initiation component, which could be the same initiation component or a different deactivation initiation component, could be triggered by the activation object or a different deactivation object, to deactivate the optic. The triggering could be caused by a second movement (as compared to the first movement which activated the optic) with respect to the activation object, which includes a different deactivation object. The second movement is not necessarily the next movement that occurs to the optic after the first movement, but rather is simply used to delineate a different movement with respect to the first movement. In other words, the terms first and second do not delineate a particular number of movements or even a sequence of movements, but rather is used to delineate a difference between the first movement which triggers the initiation component to activate the optic and a different second movement which triggers the initiation component (which includes a different initiation component) to deactivate the optic.

The second movement includes movement of the optic to a third position, which could be the same as the first position. For example, if a first position is the optic on a firearm within a holster, the third position could also be the optic on a firearm within the holster. However, the third position could also be different than the first position. For example, if a first position is the optic on a rifle which is held to a user's chest, the third position may be the optic on a rifle held to a user's chest, but in a different location or position on the user's chest. Additionally, while the activation object may be the same as the deactivation object, they may also be different objects. In this case, the activation object and deactivation object may be in different locations. For example, the activation object could be in a holster and the deactivation object may be on a belt of the user.

While the activation object and deactivation object could be the same or different objects, the technique used with the deactivation object could be the same as the technique used with the activation object. For example, the deactivation object (whether the same or different object as the activation object) could be a physical protrusion or could electrically communicate with the initiation component (whether the same initiation component or a different initiation component). Thus, any of the previously described activation object and initiation component sets or combinations thereof could be used for triggering the initiation component and causing the optic to be deactivated. For example, the activation object could touch the initiation component to cause the deactivation, the activation object could be within a predetermined distance with respect to the initiation component to cause the deactivation, the activation object could be outside a predetermined distance to cause the deactivation, and/or the like. It should be noted that different activation and deactivation techniques can be utilized.

Figure 2:
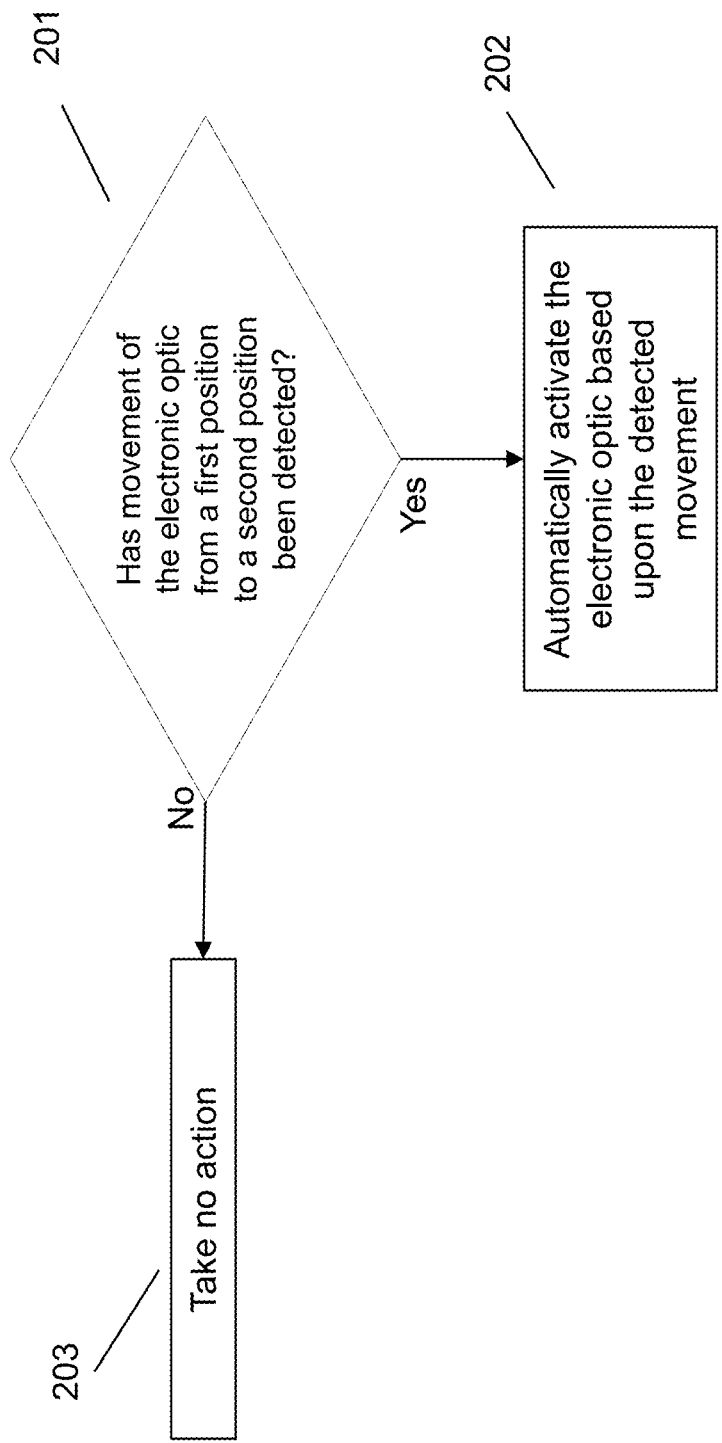
FIG. 2 illustrates an example method for automatically activating an electronic optic based upon detected movement of the optic with respect to an activation object.

FIG. 2 illustrates an example method for the automatic activation of an electronic optic using an activation object. At 201, the system, which may be the optic, may determine whether a movement of the electronic optic from a first position to a second position has been detected. This detection of the movement of the electronic optic can be performed using any of the techniques described further herein or similar techniques. In other words, the system may detect movement of the electronic optic having an initiation component from a first position to a second position, where the movement is with respect to an activation object.

If no movement has been detected at 201, the system may take no action at 203. In other words, the optic will not be activated. No action may also occur if the movement is not enough to trigger the activation. In other words, if there is a movement but it is not to the second position, then the optic will not be activated. If, on the other hand, movement from the first position to the second position is detected at 201, the system may automatically activate, based upon the detected movement, the electronic optic at 202. The automatic activation includes receiving a signal from the initiation component of the electronic optic to activate the optic based upon the initiation component being triggered via the activation object. Similarly, the optic could be automatically deactivated in a similar manner upon detection of movement of the optic to a third position.

As an overall example, a user may have a pistol that is holstered. On the holster may be an RFID tag or sticker that communicates with an initiation component within the optic. When the user unholsters the pistol, the initiation component of the optic is moved outside a threshold distance from the RFID tag on the holster. This movement past the threshold distance causes the initiation component to be triggered and activate the optic. Thus, when the user has the optic to a position of use, the optic will already be activated. When the user re-holsters the pistol, the initiation component and the RFID tag are within the threshold distance and the initiation component is triggered to deactivate the optic, thereby conserving the battery of the optic.

As another example, a user may have a rifle that is used with a sling. The user may have an emitter that is located on their chest where the rifle is located when not in use. When the user moves the rifle to position to use the optic, the initiation component of the optic is triggered based upon the initiation component of the optic being moved a threshold distance from the emitter. The triggering of the initiation component of the optic causes the activation of the optic. When the user puts the rifle in the not used position against their chest, the emitter and initiation component are within the threshold distance, thereby triggering the initiation component of the optic to deactivate the optic.

As a final, non-limiting example, the user may have a BB pistol located in a safe or compartment. The safe or compartment includes a magnetic strip along an opening of the safe or compartment. When the BB pistol is moved out of the opening of the safe or compartment, the initiation component of the optic detects the magnetic field and is triggered. Upon being triggered, the initiation component causes the optic to be activated. When the BB pistol is placed back within the safe or compartment, a deactivation initiation component is triggered, thereby deactivating the optic.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A device, the device comprising:
an electronic optic comprising an initiation component, wherein the initiation component is triggered via an activation object located external to the electronic optic;
wherein the initiation component, when triggered, causes activation of the electronic optic;
wherein a movement of the electronic optic from a first position to a second position comprises a movement with respect to the activation object and causes the triggering of the initiation component; and
wherein the initiation component is subsequently triggered via the activation object and causes deactivation of the electronic optic, wherein the subsequent triggering is based upon a second movement of the electronic optic to a third position and with respect to the activation object.

2. The device of claim 1, wherein the activation object is located on an object other than the electronic optic.

3. The device of claim 1, wherein the initiation component comprises a receiver and wherein the activation object comprises a passive transmitter.

4. The device of claim 1, wherein the initiation component is triggered via receipt of an electric signal from the activation object.

5. The device of claim 1, wherein the initiation component is triggered when the movement causes the activation object to be a predetermined threshold distance from the initiation component.

6. The device of claim 1, wherein the initiation component is triggered when the movement causes the initiation component to be within a predetermined distance of the activation object.

7. The device of claim 1, wherein the initiation component is triggered by the activation object when the movement causes the activation object to touch the initiation component.

8. The device of claim 1, wherein the initiation component is subsequently triggered when the second movement causes the activation object to be within a predetermined threshold distance to the initiation component.

9. The device of claim 1, wherein the electronic optic comprises an additional initiation component and wherein the triggering is further based upon information received from the additional initiation component.

10. A system, the system comprising:
an electronic optic comprising an initiation component that causes activation of the electronic optic; and
an activation object located external to the electronic optic;
wherein the initiation component is triggered by the activation object;
wherein a movement of the electronic optic from a first position to a second position comprises a movement with respect to the activation object and causes the triggering of the initiation component; and
wherein the initiation component is subsequently triggered via the activation object and causes deactivation of the electronic optic, wherein the subsequent triggering is based upon a second movement of the electronic optic to a third position and with respect to the activation object.

11. The system of claim 10, wherein the activation object comprises a physical protrusion that touches the initiation component.

12. The system of claim 10, wherein the activation object comprises an object that electrically communicates with the initiation component and, responsive to the movement, sends a signal to the initiation component to trigger the initiation component.

13. The system of claim 12, wherein the initiation component comprises a receiver and wherein the activation object comprises a passive transmitter.

14. The system of claim 10, wherein the activation object is located on an object other than the electronic optic.

15. The system of claim 10, wherein the initiation component is triggered when the movement causes the activation object to be a predetermined threshold distance from the initiation component.

16. The system of claim 10, wherein the initiation component is triggered when the movement causes the initiation component to be within a predetermined distance of the activation object.

17. The system of claim 10, wherein the electronic optic comprises an additional initiation component and wherein the triggering is further based upon information received from the additional initiation component.

18. A method for automatically activating an electronic optic, the method comprising:
- detecting, using an initiation component of the electronic optic, movement of the electronic optic from a first position to a second position, wherein the movement comprises movement with respect to an activation object;
- automatically activating, based upon the detected movement, the electronic optic, wherein the automatically activating comprises receiving a signal from an initiation component of the electronic optic that is triggered via the activation object; and
- automatically deactivating, using the initiation component and responsive to detecting a second movement of the electronic optic to a third position and with respect to the activation object, the electronic optic.

* * * * *